(12) United States Patent
Obata et al.

(10) Patent No.: US 8,989,363 B2
(45) Date of Patent: Mar. 24, 2015

(54) INCOMING CALL FORWARDING MANAGEMENT SERVER, CALL-BACK TERMINAL APPARATUS, AND INCOMING CALL FORWARDING SYSTEM

(75) Inventors: Hiroshi Obata, Chiyoda-ku (JP); Kensuke Ohno, Chiyoda-ku (JP)

(73) Assignee: NTT DOCOMO, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 13/823,871

(22) PCT Filed: Jul. 17, 2012

(86) PCT No.: PCT/JP2012/004566
§ 371 (c)(1),
(2), (4) Date: Mar. 15, 2013

(87) PCT Pub. No.: WO2013/035234
PCT Pub. Date: Mar. 14, 2013

(65) Prior Publication Data
US 2014/0177817 A1 Jun. 26, 2014

(30) Foreign Application Priority Data

Sep. 9, 2011 (JP) ................................. 2011-197586

(51) Int. Cl.
*H04M 3/54* (2006.01)
*H04W 4/16* (2009.01)
*H04M 3/42* (2006.01)

(52) U.S. Cl.
CPC ............ *H04M 3/54* (2013.01); *H04M 3/42263* (2013.01); *H04M 3/42195* (2013.01); *H04M 3/42025* (2013.01)
USPC ............ 379/210.01; 379/201.04; 379/211.02; 455/417

(58) Field of Classification Search
CPC ..... H04M 3/42195; H04M 3/48; H04M 3/54; H04M 3/58; H04W 4/16
USPC ............ 379/201.01, 201.02, 201.04, 207.02, 379/211.02, 210.01; 455/414.1, 417
See application file for complete search history.

(56) References Cited

U.S. PATENT DOCUMENTS

| 6,738,466 B1 | 5/2004 | LaPierre et al. |
| 2002/0145973 A1* | 10/2002 | Shah et al. ................... 370/220 |
| 2009/0097629 A1 | 4/2009 | Huslak et al. |

FOREIGN PATENT DOCUMENTS

| JP | 07-110020 B2 | 6/1988 |
| JP | 2-45389 B2 | 10/1990 |

(Continued)

OTHER PUBLICATIONS

PCT/JP2012/004566 PCT/ISA/210, dated Aug. 28, 2012, 3 pages.

(Continued)

Primary Examiner — Harry S Hong
(74) Attorney, Agent, or Firm — Crowell & Moring LLP

(57) ABSTRACT

An incoming call relaying status identifying unit determines whether or not a call receiving request from an incoming call forwarding system is delivered through a preset forward source terminal apparatus based on incoming call relaying status identifying information included in the call receiving request. Next, when a determination based on the incoming call relaying status identifying information brings about a positive result, a display unit displays information for a call-back including forward source terminal information representing the forward source terminal apparatus utilized for relaying the incoming call based on the incoming call relaying status identifying unit. This makes it possible for a user of a forward destination to recognize from which forward source the incoming call is forwarded.

5 Claims, 5 Drawing Sheets

(56) References Cited

FOREIGN PATENT DOCUMENTS

| | | |
|---|---|---|
| JP | 05-022455 A | 1/1993 |
| JP | 2004-064173 A | 2/2004 |
| JP | 2004-282265 A | 10/2004 |
| JP | 2005-348233 A | 12/2005 |
| JP | 2006-222666 A | 8/2006 |
| JP | 2010-130672 A | 6/2010 |
| JP | 2011-160241 A | 8/2011 |

OTHER PUBLICATIONS

Japanese Office Action dated Apr. 16, 2013 with mechanical English translation (Six (6) pages).
PCT/JP2012/004566 PCT/IB/310, dated Jul. 15, 2013, 1 page.
PCT/JP2012/004566 PCT/ISA/237, dated Aug. 28, 2012, 5 pages.
European Search Report dated Jan. 8, 2014 (Seven (7) sheets).
Chinese Office Action dated Dec. 2, 2014, with English translation (7 pages).

* cited by examiner

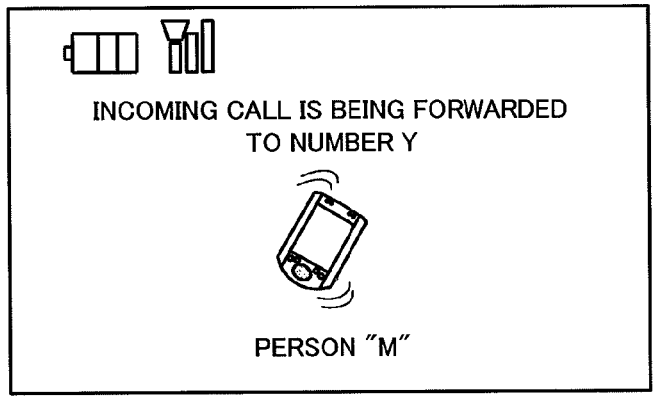
FIG. 1A
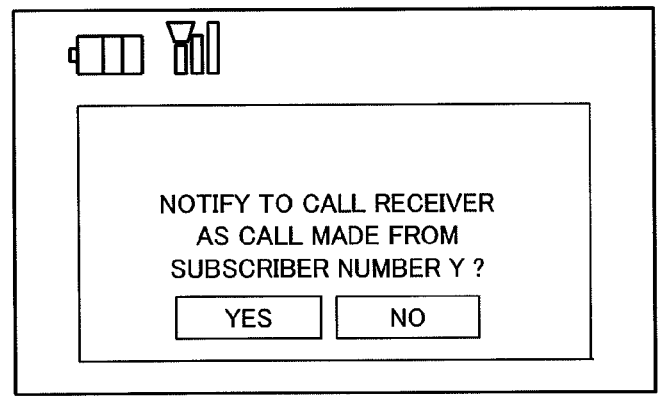
FIG. 1B
FIG. 1C
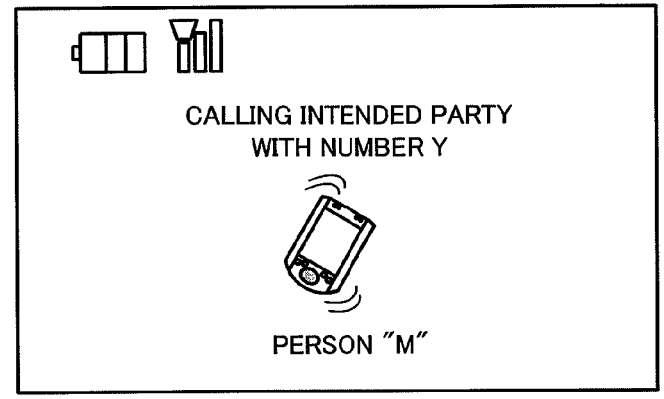
FIG. 1D

| CONTRACT No. | FORWARD DESTINATION | FORWARD SOURCE (DUMMY No.) |
|---|---|---|
| X | — | x |
| Y | X | y |
| W | X | w |

INCOMING CALL FORWARDING MANAGEMENT SERVER, CALL-BACK TERMINAL APPARATUS, AND INCOMING CALL FORWARDING SYSTEM

TECHNICAL FIELD

The present invention relates to an incoming call forwarding management server, a call-back terminal apparatus, and an incoming call forwarding system which improve the convenience of a user subscribing to an incoming call forwarding service.

BACKGROUND ART

A call forwarding service for forwarding an incoming call from a call originator terminal device to a forward destination terminal device via a forward source terminal device is well known.

According to the call forwarding service, the same user often possesses a plurality of forward source terminal devices used for relaying an incoming call.

In many cases, as explained above, the user having a plurality of forward source terminal devices makes a setting in such a way that all incoming calls to the plurality of forward source terminal devices are forwarded to the same forward destination terminal device. This allows one terminal device to collectively receive information from various forward sources.

In general, when one forward destination terminal device is attempted to collectively receive incoming calls from the plurality of forward source terminal devices, it is unclear which one of forward source terminal devices relays the incoming request from a certain call originator terminal device.

Accordingly, when the user of the forward destination terminal device views a history of received calls, and carelessly calls back (returns the call), various confusions may occur.

An example is that when the user of the forward destination terminal device makes public only a specific forward source terminal device to the outside, but desires to keep the forward destination terminal device in secret. In such a case, when a call-back is carelessly made as explained above, the presence of the forward destination terminal device is revealed to a user receiving the call-back.

On the other hand, the above-explained call-back is an incoming call from an unexpected terminal device (telephone number) for the user of the call originator terminal device. Accordingly, the user of the call originator terminal device receiving the call-back may regard that this incoming call is made from a suspicious individual, and may not answer the call.

In order to assist communication between users relating to such a call-back, there is proposed a technology which makes a setting in advance for an execution condition of requesting a call-back to display on the screen showing a history of received calls of the forward destination terminal device, when this execution condition is satisfied, a message for requesting a call-back to the call originator terminal device (see, for example, Patent Document 1).

According to the technology disclosed in Patent Document 1, however, there is no particular consideration shown to the possibility that the above-explained confusion may occur at the time of making the call-back due to that fact that it is unclear which one of the forward source terminal devices for relaying the incoming call relays an incoming request from a certain call originator

PRIOR ART DOCUMENT

Patent Document

Patent Document 1: JP 2011-160241 A

SUMMARY OF THE INVENTION

Problem to be Solved

The present invention has been made in view of the above-explained circumstance, and it is an object of the present invention to provide an incoming call forwarding management server, a call-back terminal apparatus, and an incoming call forwarding system which can suppress a confusion at a call-back receiving side that is worried when a user subscribing to an incoming call forwarding service uses a plurality of forward source terminal devices relaying an incoming call.

Solution to the Problem

To accomplish the above object, there is provided an incoming call forwarding management server which is applied to an incoming call forwarding system that forwards, to a forward destination terminal apparatus with a call-back function, an incoming call from a call originator terminal apparatus to a forward source terminal apparatus, the incoming call forwarding management server comprising: an incoming call forwarding configuration setting data storing unit configured to store incoming call forwarding configuration setting data which represents a correspondence relationship between the forward source terminal apparatus and the forward destination terminal apparatus in a subscription contract of an incoming call forwarding service; a relay configuration defining information forming unit configured to extract corresponding incoming call forwarding configuration setting data from the incoming call forwarding configuration setting data stored in the incoming call forwarding configuration setting data storing unit in response to a request for information relating to a forward destination, to form relay configuration defining information defining a relay configuration of the incoming call based on the extracted incoming call forwarding configuration setting data; and a forward destination information replying unit configured to include the relay configuration defining information formed by the relay configuration defining information forming unit in a forward destination information reply that is a reply to the request for the information relating to the forward destination.

According to such a configuration, the forward destination information reply from the forward destination information replying unit includes relay configuration defining information for specifying the forward source terminal apparatus that is the forward source of an incoming call. Hence, when making a call-back, the user of the forward destination terminal apparatus can recognize which terminal apparatus has relayed the incoming call (the forward source terminal apparatus) based on the relay configuration defining information. Accordingly, an appropriate call-back can be made, and a confusion at the call-back receiving end can be prevented.

Moreover, the incoming call forwarding management server may further include a call-back originator information converting unit configured to convert, at a time of a call-back from the forward destination terminal apparatus, call-back originator information representing an originator of the call-back in such a way that information representing the forward source terminal apparatus by the incoming call forwarding configuration setting data stored in the incoming call forwarding configuration setting data storing unit is applied, instead of information representing the forward destination terminal apparatus.

According to such a configuration, as the call-back originator information representing the originator of the call-back, information representing the forward source terminal apparatus that has relayed the incoming call is applied instead of information representing the forward destination terminal apparatus. Accordingly, the call-back receiving end automatically recognizes that it is a response from the expected party, and thus no confusion occurs.

When the incoming call forwarding configuration setting data stored in the incoming call forwarding configuration setting data storing unit may be data defining that dummy terminal information is applied, instead of information representing the forward source terminal apparatus, the forward destination information replying unit causes the relay configuration defining information forming unit to form relay configuration defining information defining that the dummy terminal information is applied instead of the information representing the forward source terminal apparatus as the relay configuration defining information.

According to such a configuration, the dummy terminal information is applied for the forward source terminal apparatus, and thus a disadvantage such that relay configuration defining information that should be kept in secret leaks out can be prevented even if the call-back terminal apparatus of the user falls into another person's hands.

There is provided a call-back terminal apparatus, according to another aspect of the present invention, applied to an incoming call forwarding system which forwards, to a forward destination terminal apparatus, an incoming call from a call originator terminal apparatus to a forward source terminal apparatus, the call-back terminal apparatus comprising: an incoming call relaying status identifying unit configured to obtain, when a call receiving request from the incoming call forwarding system is delivered through a preset forward source terminal apparatus, forward source terminal information representing the forward source terminal apparatus used for relaying of the incoming call based on incoming call relaying status identifying information included in the call receiving request; and a display unit configured to receive the obtained forward source terminal apparatus from the incoming call relaying status identifying unit, to display information for a call-back in a form of including a display of the forward source terminal apparatus based on the received forward source terminal information.

According to such a configuration, when making a call-back, the user of the forward destination terminal apparatus can recognize which terminal apparatus has relayed the incoming call (the forward source terminal apparatus) based on the display of the call-back information on the display unit. Accordingly, an appropriate call-back can be made, and thus a confusion at the call-back receiving end can be prevented.

Moreover, when the incoming call relaying status identifying information includes dummy terminal information to be applied, instead of the forward source terminal information, the display unit may display the dummy terminal information, instead of the forward source terminal information.

According to such a configuration, the display unit displays the dummy terminal information of the forward source terminal apparatus, and thus a disadvantage such that the forward source terminal information that should be kept in secret leaks out can be suppressed even if the call-back terminal apparatus falls into another person's hands.

There is provided an incoming call forwarding system, according to yet another aspect of the present invention, that forwards, to a forward destination terminal apparatus with a call-back function, an incoming call from a call originator terminal apparatus to a forward source terminal apparatus under management of an incoming call forwarding management server, and the incoming call forwarding management server comprises: an incoming call forwarding configuration setting data storing unit configured to store incoming call forwarding configuration setting data which represents a correspondence relationship between the forward source terminal apparatus and the forward destination terminal apparatus in a subscription contract of an incoming call forwarding service; a relay configuration defining information forming unit configured to extract corresponding incoming call forwarding configuration setting data from the incoming call forwarding configuration setting data stored in the incoming call forwarding configuration setting data storing unit in response to a request for information relating to a forward destination, to form relay configuration defining information defining a relay configuration of the incoming call based on the extracted incoming call forwarding configuration setting data; and a forward destination information replying unit configured to include the relay configuration defining information formed by the relay configuration defining information forming unit in a forward destination information reply that is a reply to the request for the information relating to the forward destination.

According to such a configuration, the forward destination information reply output by the incoming call forwarding management server includes relay configuration defining information for specifying the forward source terminal apparatus that is the forward source of an incoming call. Hence, when making a call-back, the user of the forward destination terminal apparatus can recognize which terminal apparatus has relayed the incoming call (the forward source terminal apparatus) based on the relay configuration defining information. Accordingly, an appropriate call-back can be made, and a confusion at the call-back receiving end can be prevented.

Advantageous Effects of the Invention

According to an aspect of the present invention, an incoming call forwarding management server, a call-back terminal apparatus, and an incoming call forwarding system can be provided which can suppress a confusion at a call-back receiving end that is expected when a user subscribing to an incoming call forwarding service uses a plurality of forward source terminal devices relaying an incoming call.

BRIEF DESCRIPTION OF THE DRAWINGS

FIGS. 1A to 1D are diagrams for explaining an outline of a function of a call-back terminal device according to an embodiment of the present invention;

DESCRIPTION OF EMBODIMENTS

Figure 2:
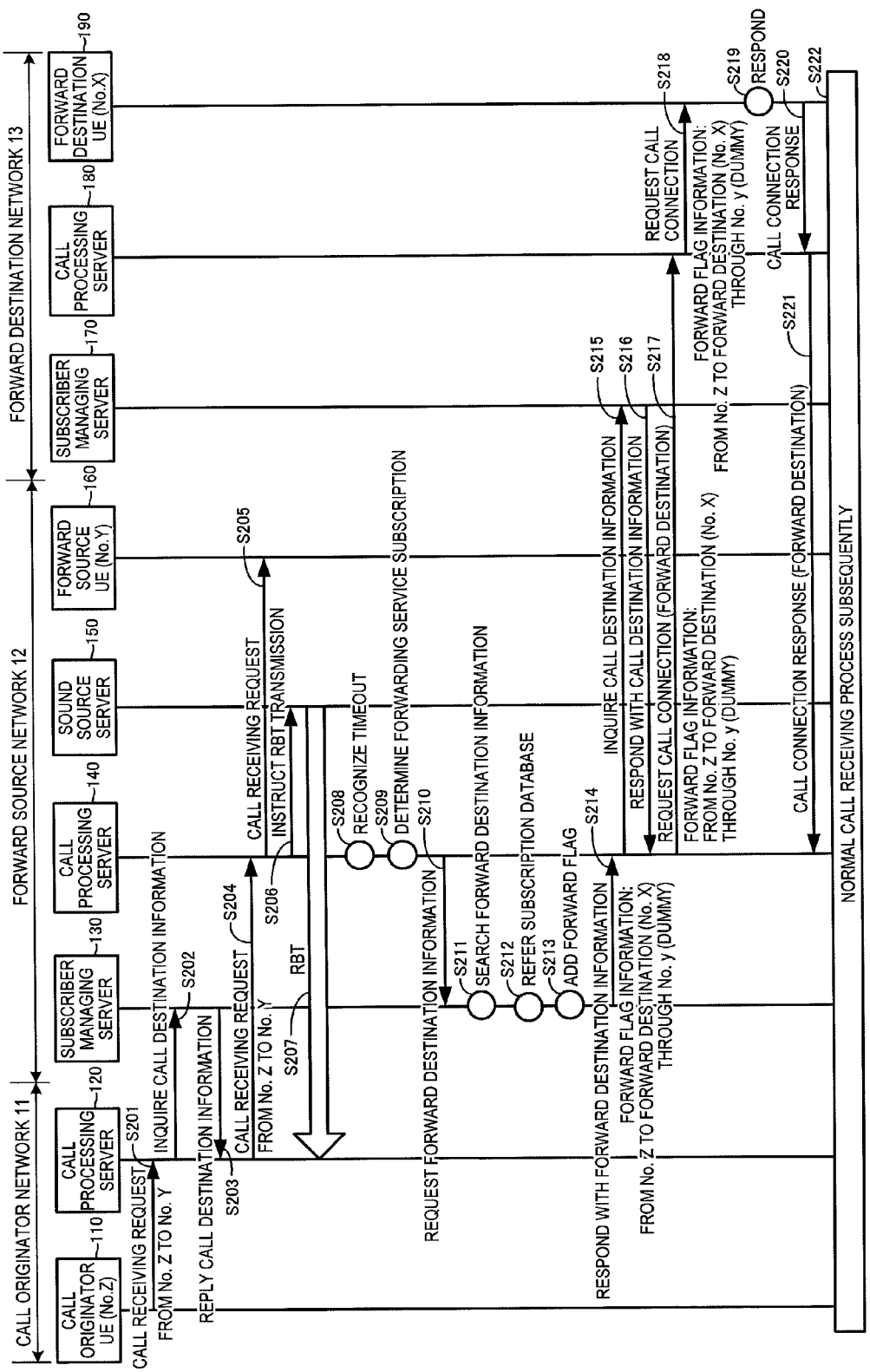
FIG. 2 is a sequence chart illustrating configuration and operation of an incoming call forwarding system including the call-back terminal device and an incoming call forwarding management server according to an embodiment of the present invention from a call originator to a forward destination.

An explanation will now be given of an embodiment of the present invention in detail with reference to the accompanying drawings, thereby clarifying the present invention.

(Outline of Function of Incoming Call Forwarding System of Present Invention)

FIGS. 1A to 1D are diagrams for explaining an outline of a function of a call-back terminal device according to an embodiment of the present invention.

FIG. 1A illustrates an example display in a call-back terminal device when an incoming call is forwarded to and received by the call-back terminal device according to an embodiment of the present invention from a forward source terminal device added with a number "Y". This display is on a display of the call-back terminal device, and the same is true of following FIG. 1B to FIG. 1D.

As illustrated in the figure, it is displayed from which forward source a call is forwarded among a plurality of terminal devices capable of functioning as forward sources, and the user of a call originator terminal device is a person "M".

FIG. 1B illustrates an example display of a list of received calls when the call-back terminal device in FIG. 1A makes a call-back.

As illustrated in the figure, the list of received calls from a person "L", the person "M", and a person "N" is displayed together with the telephone numbers of the respective persons. It is also displayed from which forward source each incoming call is forwarded corresponding to the list of those received calls.

In the illustrated example case, it is displayed that an incoming call from the person "L" is directly received through no forwarding, the incoming call from the person "M" is received from the forward source terminal device added with the number "Y", and the incoming call from the person "N" is received from a forward source terminal device added with a number "W".

In this example, as explained above, the numbers indicating the respective real forward source terminal devices are displayed.

However, it is undesirable in some cases that a number indicating a real forward source terminal device is displayed as explained above and data that is a source of this display is stored. An example of such a case is that the user of the call-back terminal device wants to keep the number indicating the real forward source terminal device in secret to the third person. In such a case, if the user loses or has the call-back terminal device stolen, and that call-back terminal device is fallen into another person, information that should be kept in secret is revealed. According to an embodiment of the present invention, such a concern is taken into consideration, but this will be discussed in detail later with reference to the accompanying drawings.

FIG. 1C illustrates an example display of a call-back guidance when the call-back terminal device in FIG. 1A makes a call-back.

In the illustrated example, a display is performed which indicates that a made call is not from the call-back terminal device itself (in this example, denoted by "X") but from the forward source terminal device added with the number "Y", and which prompts a selection of whether or not to notify the call receiving end (i.e., the person "M" who is the call originator).

In the display of prompting such a selection, when "YES" is selected, a notification to the person "M" at the call receiving end (hence, the call originator) is made as a call made from the forward source terminal device added with the number "Y".

In this case, it is a call-back for the person "M" who is the call originator from the intended party to which the person "M" originally made a call, and thus the possibility of the occurrence of a confusion such that the person "M" has a doubt as if the incoming call is made from an unexpected person and does not respond to that call-back is little.

Conversely, when "NO" is selected, a call-back is performed like a normal call-back as a call made from the call-back terminal device "X".

FIG. 1D illustrates an example operation display during a call-back activation when "YES" is selected in the guidance display in FIG. 1C.

In the illustrated example, it is displayed that a call-back is being performed as a call made from the forward source terminal device added with the number "Y" and the call receiving end (hence, the call originator) is the person "M".

(Configuration and Operation of Incoming Call Forwarding System)

FIG. 2 is a sequence chart illustrating configuration and operation of the incoming call forwarding system including the call-back terminal device according to an embodiment of the present invention from the call originator to the forward destination.

The incoming call forwarding system according to the embodiment illustrated in FIG. 2 includes following respective units of networks which are a call originator network 11, a forward source network 12, and a forward destination network 13.

The call originator network 11 includes a call originator terminal device (indicated by UE in the figures) 110 and a call processing server 120.

Moreover, the forward source network 12 includes a subscriber managing server 130 as an incoming call forwarding management server according to an embodiment of the present invention, a call processing server 140, a sound source server 150, and a forward source UE 160 (No. Y).

Furthermore, the forward destination network 13 includes a subscriber managing server 170, a call processing server 180, and a forward destination UE (No. X) 190 as the call-back terminal apparatus.

(Example Function and Operation of Respective Components of Incoming Call Forwarding System)

Next, an explanation will be given of function and operation of respective components of the incoming call forwarding system with reference to the sequence chart of FIG. 2.

According to the example incoming call forwarding system in FIG. 2, the forward source UE 160 (No. Y) and the forward destination UE (No. X) 190 are terminal devices possessed by the same user subscribing to the incoming call forwarding service.

In this example, it is presumed that the user subscribes to a service of using another UE (No. W) not illustrated in the sequence chart and as a forward source UE that relays an incoming call in addition to the above-explained UE 160 (No. Y).

It is also presumed that a setting is made in such a way that an incoming call reaching the UE of No. Y and an incoming call reaching the UE of No. W are all forwarded to the forward destination UE (No. X) 190.

In the above-explained case, it is not always necessary that the same user uses the forward source UE 160 and the forward destination UE (No. X) 190 in actual use. That is, it is permitted that, instead of the user of the forward source UE 160 and subscribing to the call forwarding service of an incoming call to the forward source UE 160, another related user is the actual user of the forward destination UE (No. X) 190.

A case is taken into consideration in which another user makes a call from the call originator UE (No. Z) 110 to the forward source UE 160 (No. Y).

In the above-explained consideration, first, the call originator UE (No. Z) 110 transmits a call connection request to the call processing server 120 (step S201).

When receiving the call connection request in the step S201, the call processing server 120 inquires call destination information to the subscriber managing server 130 as the incoming call forwarding management server (step S202).

When receiving an inquiry in the step S202, the subscriber managing server 130 replies the call destination information to the call processing server 120 (step S203).

When receiving the call destination information in the step S203, the call processing server 120 transmits a call connection request to the call processing server 140 provided over the forward source network 12 according to an embodiment of the present invention (step S204).

When receiving the call connection request in the step S204, the call processing server 140 transmits a call connection request to the forward source UE 160 (No. Y) (step S205).

When receiving the call connection request in the step S204, the call processing server 140 transmits, to the sound source server 150, an instruction of outputting an Ring Back Tone (RBT) (step S206).

When receiving the RBT output instruction in the step S206, the sound source server 150 supplies an RBT to the call originator UE 110 (step S207).

It is presumed that the forward source UE 160 (No. Y) that has received the call connection request in the former step S205 is in a condition in which the user is unable to perform a responsive operation or in a condition in which that UE is in an out-of-service location and is unable to respond. Under such a condition, the forward source UE 160 (No. Y) is recognizing that the local device is in a no-response condition.

When the forward source UE 160 (No. Y) is in the no-response condition as explained above, the call processing server 140 counts a continued time of the no-response condition of the forward source UE 160 (No. Y), and when the no-response condition continues over a predetermined elapsed time, it is detected that a condition becomes a timeout condition (step S208). When it becomes the timeout condition as explained above, this means that a forwarding of the incoming call (the call connection request in the step S205) from the forward source UE 160 (No. Y) to the preset forward destination is triggered.

After detecting the timeout in the step S208, the call processing server 140 determines whether or not the forward source UE 160 (No. Y) is a qualified subscriber of the incoming call forwarding service (step S209). It is presumed that the forward source UE 160 (No. Y) is a qualified subscriber, and the call processing server 140 recognizes it.

When recognizing in the step S209 that the forward source UE 160 (No. Y) is the qualified subscriber, next, the call processing server 140 transmits a forward destination information request to the subscriber managing server 130 (step S210).

When receiving the forward destination information request in the step S210, the subscriber managing server 130 searches, from incoming call forwarding configuration setting data in subscriber contract data of the incoming call forwarding service, forward destination information relating to the forward source UE 160 (No. Y), and extracts this forward destination information (step S211).

When extracting the forward destination information relating to the forward source UE 160 (No. Y) in the step S211, the subscriber managing server 130 refers to subscription database, and recognizes the content of the contract relating to the incoming call forwarding service (step S212).

(Example Incoming Call Forwarding Configuration Setting Data)

Figures 3, 4:
FIG. 3 is a conceptual diagram illustrating incoming call forward configuration setting data possessed by the incoming call forwarding management server in the incoming call forwarding system illustrated in FIG. 2.
FIG. 4 is a diagram illustrating an example display by a display unit when the call-back terminal device activates a response process in the incoming call forwarding system illustrated in FIG. 2.

FIG. 3 is a conceptual diagram illustrating example incoming call forwarding configuration setting data possessed by the subscriber managing server 130.

In FIG. 3, respective numbers "X", "Y", and "W" in capital letters indicated in the field of "contract No." are the numbers of respective UEs used by the same user subscribing to the incoming call forwarding service.

As is clear with reference to FIG. 3, a setting is made in such a way that all incoming calls to the respective UEs of "Y" and "W" in capital letters are forwarded to the above-explained forward destination UE (No. X) 190 with reference to FIG. 2. That is, according to this contract, the user of the UE (No. X) 190 makes a setting so that incoming calls from all forward source UEs used for relaying the incoming calls are collectively received through one UE (No. X) 190.

Meanwhile, when a case is taken into consideration in which the user loses the UE (No. X) 190, and another person obtains and keeps this UE (No. X) 190 in hand, information leakage that is extremely involuntary to this user may occur. More specifically, this is a case in which this user makes a setting in such a way that respective incoming calls to the plurality of UEs "Y" and "W" are correctively received through one UE (No. X) 190, but the user desires to keep the presence of at least any one of the UEs "Y" and "W" in secret. In this case, if a person obtained the lost UE (No. X) 190 views the history of received calls of this UE (No. X) 190, that person may become to know the presence of the relaying UEs "Y" and "W" and the setting for the forwarding of an incoming call through those UEs.

According to this embodiment, in order to eliminate the disadvantage of the above-explained information leakage, a dummy number is used instead of an actual official registered number representing the forward source terminal apparatus relaying an incoming call.

In the example case illustrated in FIG. 3, instead of the respective official contract numbers "X", "Y", and "W" in capital letters, dummy numbers "x", "y", and "w" in uncapitalized letters corresponding to the respective official numbers are applied. In this example case, no actual number "Y" and "W" for the relaying UEs are left in the history of received calls in the UE (No. X) 190, but the dummy numbers "y" and "w" are displayed instead of those actual numbers "Y" and "W", and the dummy numbers "y" and "w" are left in the list of received calls.

Hence, according to this embodiment, disadvantages such that the presence of the relaying UEs "Y" and "W" and the setting relating to the forwarding of an incoming call therethrough are revealed to another person can be eliminated.

Data obtained in the step S212 by referring to the incoming call forwarding configuration setting data possessed by the subscriber managing server 130 is as illustrated in the above-explained FIG. 3.

Next, the subscriber managing server 130 adds a forward flag to the forward destination information response (step S213).

This forward flag includes information to the effect that an incoming call is forwarded from a call originator UE (No. Z) 110 to the forward destination UE (No. X) 190 through the UE associated with the above-explained dummy number "y" in FIG. 3.

In step S213, the forward destination information response together with the above-explained added forward flag is transmitted to the call processing server 140 (step S214).

When receiving the forward destination information response in the step S214, the call processing server 140 transmits, to the subscriber managing server 170 over the forward destination network 13, a destination information inquiry corresponding to this forward destination information response (step S215).

In response to the destination information inquiry in the step S215, the subscriber managing server 170 replies a destination information response to the call processing server 140 (step S216).

In response to the destination information response in the step S216, the call processing server 140 transmits a call connection request together with the above-explained forward flag to the forward destination UE (No. X) 190 through the call processing server 180 (step S217) over the forward destination network 13 (step S218).

When receiving the call connection request in the step S218, the forward destination UE (No. X) 190 activates a response process for performing a call-back based on the information included in the forward flag (step S219).

(Display Example by Display Unit)

FIG. 4 is a diagram illustrating an illustrative display by the display unit of the forward destination UE (No. X) 190 when the response process is activated in the step S219.

As illustrated in the figure, respective received calls from the person "L", the person "M", and the person "N" are displayed together with the telephone numbers of the respective persons. Moreover, it is also displayed that from which forward source each incoming call has been forwarded in a manner corresponding to the history of received calls.

In the illustrated example case, it is displayed that the incoming call from the person "L" was directly received through no forwarding. Next, according to this embodiment, in particular, the forward source UE is displayed with the above-explained dummy number in FIG. 3.

In the illustrated example case, it is simply displayed that the incoming call from the person "M" is received from the forward source UE added with the dummy number "y", and the incoming call from the person "N" is received from the forward source UE added with the dummy number "w".

Moreover, the actual numbers of the respective forward source UEs are not displayed, and are not stored in the forward destination UE (No. X) 190. Hence, even if the forward destination UE (No. X) 190 falls into another person's hand, information on the forward source UE can be kept in secret.

Subsequently to the step S219, the forward destination UE (No. X) 190 transmits a call connection reply to the call processing server 140 over the forward source network 12 (step S221) through the call processing server 180 of the forward destination network 13 (step S220).

After the step S221, a typical call receiving process in a communication system of this kind is performed (step S222).

(Call-Back from Forward Destination to Call Originator)

Figure 5:
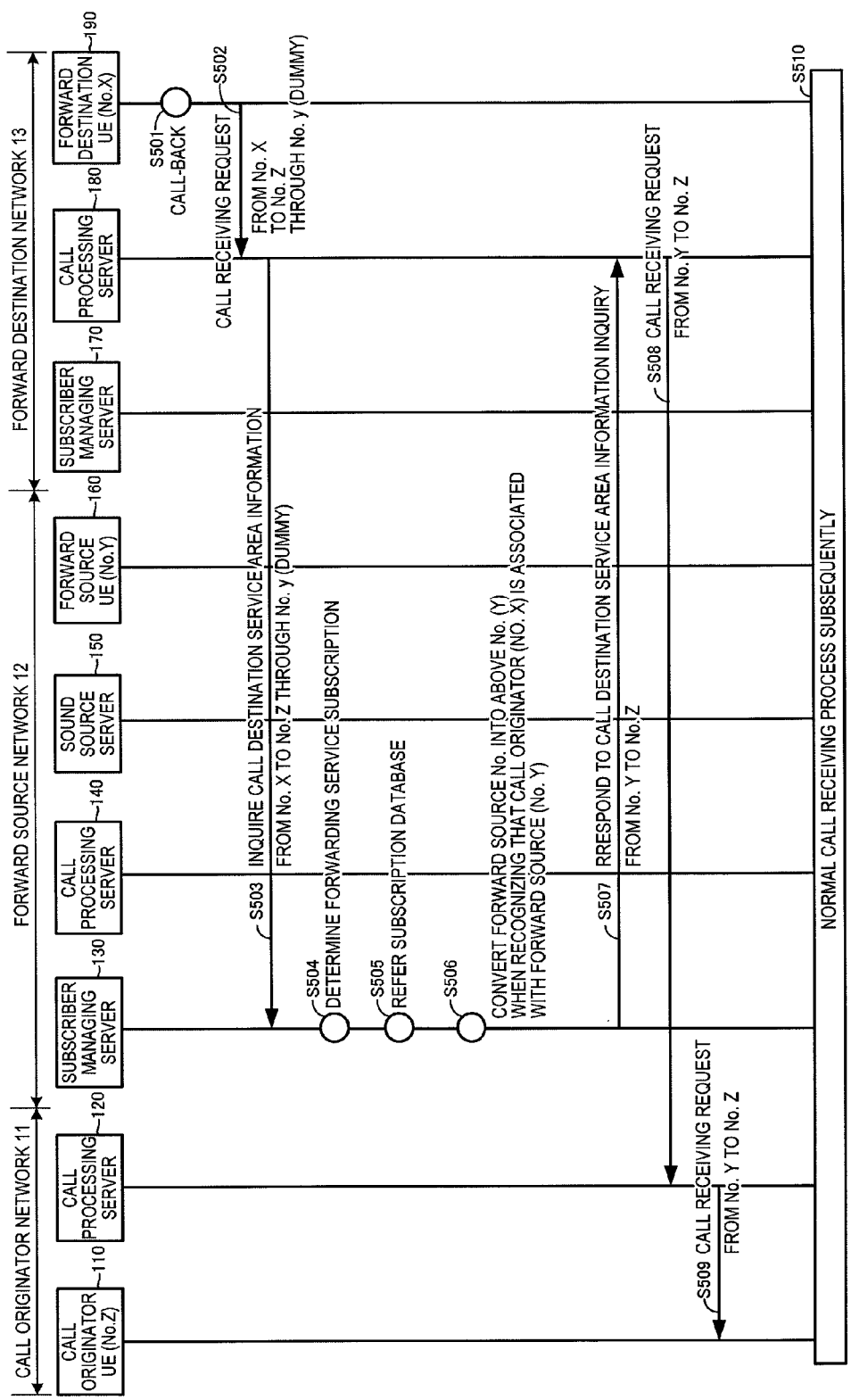
FIG. 5 is a sequence chart illustrating an operation when a call-back is made from a forward destination to a call originator in the incoming call forwarding system illustrated in FIG. 2.

FIG. 5 is a sequence chart illustrating an operation of the incoming call forwarding system in FIG. 2 in a case in which the forward destination performs a call-back to the call originator.

The forward destination UE (No. X) 190 accepts a call-back operation given by the user (step S501).

When accepting the call-back operation given by the user in the step S501, the forward destination UE (No. X) 190 transmits a call receiving request to the call processing server 180 over the forward destination network 13 (step S502).

The call receiving request in the step S502 includes information indicating that it is an incoming call from the forward destination UE (No. X) 190 to the call originator UE (No. Z) and information indicating that it is an incoming call through the UE added with the dummy number (No. y).

When receiving the call receiving request in the step S502, the call processing server 180 inquires incoming call destination service area information to the subscriber managing server 130 that serves as the incoming call forwarding management server over the forward source network 12 (step S503).

The inquiry of the incoming call destination service area information in the step S503 includes information indicating that it is an incoming call from the forward destination UE (No. X) 190 to the call originator UE (No. Z) and information indicating that it is an incoming call through the UE added with the dummy number (No. y).

When receiving the inquiry of the incoming call destination service area information in the step S503, the subscriber managing server 130 determines whether or not the forward destination UE (No. X) 190 subscribes to the incoming call forwarding service (step S504).

It is presumed in this example that the forward destination UE (No. X) 190 subscribes to the incoming call forwarding service.

Subsequently to the step S504, the subscriber managing server 130 refers to the subscription database (step S505).

Data in the database referred in the step S505 is the above-explained data with reference to FIG. 3. Hence, the subscriber managing server 130 refers to the data in FIG. 3, thereby recognizing that the call originator (the forward destination UE (No. X) 190) of the call-back and the forward source (No. Y) are associated with each other. Next, in accordance with this recognition, the number of the originator of the call-back that was initially the number (No. X) of the forward destination UE in the call-back is converted into the number (No. Y) of the forward source UE (step S506).

After the number conversion of the originator of the call-back in the step S506, the subscriber managing server 130 replies the incoming call destination service area information to the call processing server 180 over the forward destination network 13 (step S507).

When receiving the reply of the incoming call destination service area information in the step S507, the call processing server 180 transmits a call receiving request to the call originator UE (No. Z) 110 (step S509) through the call processing server 120 over the call originator network (step S508).

After the step S509, a typical call receiving process in a communication system of this kind is performed (step S510).

(Configuration of Incoming Call Forwarding Management Server)

Figure 6:
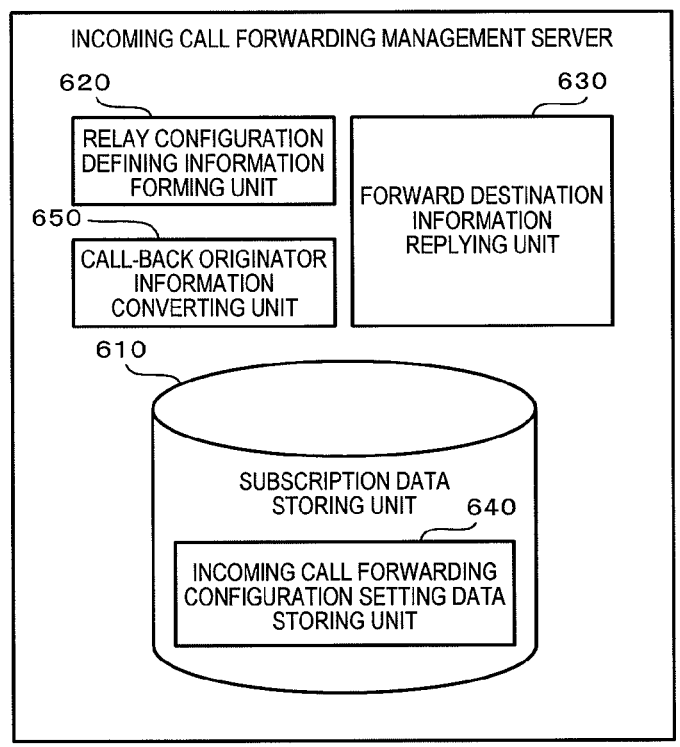
FIG. 6 is a diagram illustrating an incoming call forwarding management server according to an embodiment of the present invention.

FIG. 6 is a diagram illustrating the incoming call forwarding management server according to an embodiment of the present invention.

An incoming call forwarding management server 600 in FIG. 6 is an apparatus corresponding to the subscriber managing server 130 in FIG. 2 and FIG. 5.

This incoming call forwarding management server 600 includes a subscription data storing unit 610, a relay configuration defining information forming unit 620, and a forward destination information replying unit 630. Moreover, according to the incoming call forwarding management server 600 of this embodiment, the subscription data storing unit 610 includes an incoming call forwarding configuration setting data storing unit 640. Furthermore, the incoming call forwarding management server is provided with a call-back originator information converting unit 650.

The subscription data storing unit 610 stores various kinds of data relating to the subscription contract of a user. Moreover, the relay configuration incoming call forwarding configuration setting data storing unit 640 stores incoming call forwarding configuration setting data indicating a correspondence relationship between the forward source terminal device and the forward destination terminal device in the subscription contract of the incoming call forwarding service.

The incoming call forwarding configuration setting data is data that will be a source for searching data of the forward destination in the process of the step S211 in the sequence chart of FIG. 2, and is the one illustrated in the above-explained FIG. 3.

Subscription data stored in the subscription data storing unit 610 is data that is a source for recognizing the content of the contract as a telephone subscriber including the contract for the incoming call forwarding service in the process of the step S212 in the sequence chart of FIG. 2.

The relay configuration defining information forming unit 620 extracts corresponding incoming call forwarding configuration setting data among the pieces of incoming call forwarding configuration setting data stored in the incoming call forwarding configuration setting data storing unit 640 in response to a request for information on the forward destination in the step S210 in the sequence chart of FIG. 2. Next, relay configuration defining information that defines a relay configuration of an incoming call is formed based on the extracted incoming call forwarding configuration setting data.

The relay configuration defining information corresponds to the above-explained forward flag information with reference to the sequence chart of FIG. 2. That is, this information includes respective pieces of information representing a call originator, a forward destination, and a forward source.

The forward destination information replying unit 630 puts the relay configuration defining information formed by the relay configuration defining information forming unit 620 in the information that is the forward destination information reply in the step S214 in the sequence chart of FIG. 2. As explained above with reference to FIG. 2, the forward destination information reply is a reply to a request for the information on the forward destination (step S210).

The call-back originator information converting unit 650 performs the converting process (step S506) of the call-back originator information which is explained above with reference to the sequence chart of FIG. 5. In the example case in the step S506, this process is a process of converting the number of the originator of the call-back that was initially the number (No. X) of the forward destination UE in the call-back into the number (No. Y) of the forward source UE.

When explained more generally, this process is a process of converting the call-back originator information at the time of the call-back from the forward destination terminal apparatus in such a way that information indicating the forward source terminal device by the incoming call forwarding configuration setting data stored in the incoming call forwarding configuration setting data storing unit 640 is to be applied as the call-back originator information indicating the originator of the call-back instead of the information indicating the forward destination terminal device.

(Configuration of Call-Back Terminal Device)

Figure 7:
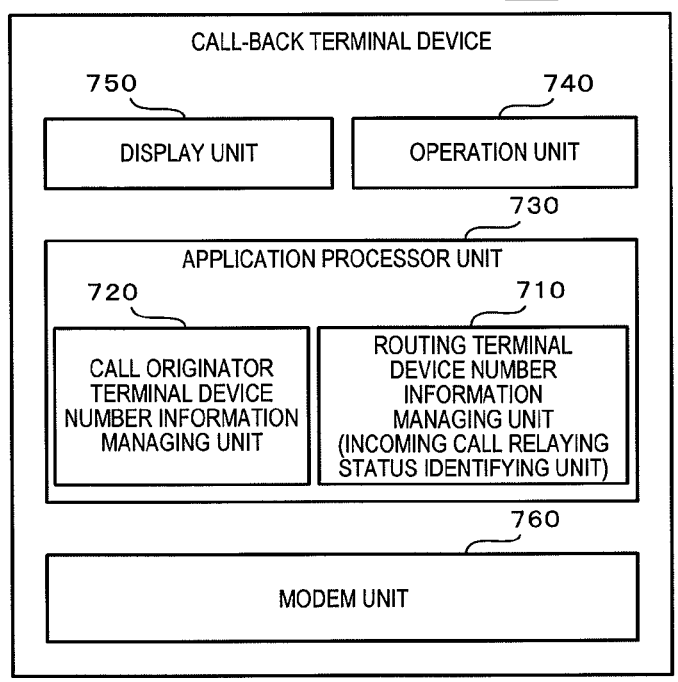
FIG. 7 is a diagram illustrating a call-back terminal device according to an embodiment of the present invention.

FIG. 7 is a diagram illustrating a call-back terminal device according to an embodiment of the present invention.

A call-back terminal device 700 in FIG. 7 is a terminal device corresponding to the forward destination UE (No. X) 190 in FIG. 2 and FIG. 5.

This call-back terminal device 700 includes an application processor unit 730 that has a routing terminal device number information managing unit 710 and a call originator terminal device number information managing unit 720, an operation unit 740, a display unit 750, and a modem unit 760.

The routing terminal device number information managing unit 710 determines, in accordance with a call connection request (step S218) reaching from the call processing server 180 in FIG. 2 through the modem unit 760, whether or not this call connection request, i.e., the call receiving request is delivered through the preset forward source terminal device based on incoming call relaying status identification information included in the call receiving request. The routing terminal device number information managing unit 710 further obtains forward source terminal information representing the forward source terminal device utilized for relaying the incoming call based on the incoming call relaying status identification information included in the call receiving request. The routing terminal device number information managing unit 710 functioning as explained above configures an incoming call relaying status identifying unit.

The call originator device number information managing unit 720 obtains and manages terminal device number information of the call originator included in the above-explained call connection request (step S218).

The operation unit 740 accepts various operations, such as a call-back operation given by the user, and other operations given when the terminal device is used.

The display unit 750 receives the obtained forward source terminal information from the incoming call relaying status identifying unit, and displays information for the call-back in the form of including the display of the forward source terminal device based on the received forward source terminal information.

The modem unit 760 is compatible with, for example, 3rd Generation (3G) or Long Term Evolution (LTE).

The scope and spirit of the present invention are not limited to the illustrated and explained illustrative embodiments, and include all embodiments bringing about the equivalent advantage as the object intended by the present invention. The scope and spirit of the present invention are not limited to the combination of the features of the present invention set forth in claims, but can be defined by any desired combination of the respective specific features among all disclosed features herein.

REFERENCE SIGNS LIST

11 Call originator network
12 Forward source network

13 Forward destination network
110 Call originator terminal device
120 Call processing server
130 Subscriber managing server
140 Call processing server
150 Sound source server
160 Forward source server
170 Subscriber managing server
180 Call processing server
190 Forward destination server
600 Incoming call forwarding management server
610 Subscription data storing unit
620 Relay configuration defining information forming unit
630 Forward destination information replying unit
640 Incoming call forwarding configuration setting data storing unit
650 Call-back originator information converting unit
700 Call-back terminal device
710 Incoming call relaying status identifying unit
720 Call originator terminal apparatus number information managing unit
730 Application processor unit
740 Operation unit
750 Display unit
760 Modem unit

The invention claimed is:

1. An incoming call forwarding management server applicable to an incoming call forwarding system for forwarding, to a forward destination terminal apparatus with a call-back function, an incoming call from a call originator terminal apparatus to a forward source terminal apparatus, the incoming call forwarding management server comprising:

an incoming call forwarding configuration setting data storing unit configured to store incoming call forwarding configuration setting data representing a correspondence relationship between the forward source terminal apparatus and the forward destination terminal apparatus in a subscription contract of an incoming call forwarding service;

a relay configuration defining information forming unit configured to extract corresponding incoming call forwarding configuration setting data from the incoming call forwarding configuration setting data stored in the incoming call forwarding configuration setting data storing unit in response to a request for information relating to a forward destination, to form relay configuration defining information defining a relay configuration of the incoming call based on the extracted incoming call forwarding configuration setting data;

a forward destination information replying unit configured to include the relay configuration defining information formed by the relay configuration defining information forming unit in a forward destination information reply that is a reply to the request for the information relating to the forward destination; and a call-back originator information converting unit configured to convert, on an occasion of a call-back from the forward destination terminal apparatus, call-back originator information representing an originator of the call-back in such a way that information representing the forward source terminal apparatus in accordance with the incoming call forwarding configuration setting data stored in the incoming call forwarding configuration setting data storing unit is to be applied, instead of information representing the forward destination terminal apparatus, when a notification of the call-back to the call originator terminal apparatus from the information representing the forward source terminal apparatus, instead of the call-back from the forward destination terminal apparatus, is selected on the forward destination terminal apparatus;

wherein on the occasion of the call-back from the forward destination terminal apparatus, the call-back with the information representing the forward source terminal apparatus is configured to be displayed on the call originator terminal apparatus in accordance with the converted call-back originator information representing the originator of the call-back, to which the information representing the forward source terminal apparatus in accordance with the incoming call forwarding configuration setting data stored in the incoming call forwarding configuration setting data storing unit is applied.

2. The incoming call forwarding management server according to claim 1, wherein when the incoming call forwarding configuration setting data stored in the incoming call forwarding configuration setting data storing unit defines that dummy terminal information is to be applied, instead of information representing the forward source terminal apparatus, the forward destination information replying unit causes the relay configuration defining information forming unit to form relay configuration defining information defining that the dummy terminal information is to be applied instead of the information representing the forward source terminal apparatus as the relay configuration defining information.

3. A call-back terminal apparatus also serving as a forward destination terminal apparatus applicable to an incoming call forwarding system for forwarding, to the forward destination terminal apparatus, an incoming call from a call originator terminal apparatus to a forward source terminal apparatus, the call-back terminal apparatus comprising:

an incoming call relaying status identifying unit configured to obtain, when a call receiving request from the incoming call forwarding system is delivered through a preset forward source terminal apparatus, forward source terminal information representing the forward source terminal apparatus applied for relaying of the incoming call based on incoming call relaying status identifying information included in the call receiving request;

a display unit configured to receive the obtained forward source terminal apparatus from the incoming call relaying status identifying unit, to display information for a call-back in a form of including a display of the forward source terminal apparatus based on the received forward source terminal information; and an operation unit configured to receive an operation of selecting on the display unit, on an occasion of a call-back from the forward destination terminal apparatus, in such a way that information representing the forward source terminal apparatus is to be applied to call-back originator information representing an originator of the call-back in accordance with the forward source terminal information representing the forward source terminal apparatus obtained by the incoming call relaying status identifying unit, instead of information representing the forward destination terminal apparatus.

4. The call-back terminal apparatus according to claim 3, wherein when the incoming call relaying status identifying information includes dummy terminal information to be applied, instead of the forward source terminal information, the display unit displays the dummy terminal information, instead of the forward source terminal information.

5. An incoming call forwarding system, comprising:
an incoming call forwarding management server for forwarding an incoming call from a call originator terminal apparatus to a forward source terminal apparatus; and
a call-back terminal apparatus that is a forward destination terminal apparatus with a call-back function;
wherein the incoming call forwarding management server comprises:
an incoming call forwarding configuration setting data storing unit configured to store incoming call forwarding configuration setting data representing a correspondence relationship between the forward source terminal apparatus and the forward destination terminal apparatus in a subscription contract of an incoming call forwarding service;
a relay configuration defining information forming unit configured to extract corresponding incoming call forwarding configuration setting data from the incoming call forwarding configuration setting data stored in the incoming call forwarding configuration setting data storing unit in response to a request for information relating to a forward destination, to form relay configuration defining information defining a relay configuration of the incoming call based on the extracted incoming call forwarding configuration setting data;
a forward destination information replying unit configured to include the relay configuration defining information formed by the relay configuration defining information forming unit in a forward destination information reply that is a reply to the request for the information relating to the forward destination; and
a call-back originator information converting unit configured to convert, on an occasion of a call-back from the forward destination terminal apparatus, call-back originator information representing an originator of the call-back in such a way that information representing the forward source terminal apparatus in accordance with the incoming call forwarding configuration setting data stored in the incoming call forwarding configuration setting data storing unit is to be applied, instead of information representing the forward destination terminal apparatus, when a notification of the call-back to the call originator terminal apparatus from the information representing the forward source terminal apparatus, instead of the call-back from the forward destination terminal apparatus, is selected on the forward destination terminal apparatus;
wherein on the occasion of the call-back from the forward destination terminal apparatus, the call-back with the information representing the forward source terminal apparatus is configured to be displayed on the call originator terminal apparatus in accordance with the converted call-back originator information representing the originator of the call-back, to which the information representing the forward source terminal apparatus in accordance with the incoming call forwarding configuration setting data stored in the incoming call forwarding configuration setting data storing unit is applied; and
wherein the call-back terminal apparatus comprising:
an incoming call relaying status identifying unit configured to obtain, when a call receiving request from the incoming call forwarding system is delivered through a preset forward source terminal apparatus, forward source terminal information representing the forward source terminal apparatus applied for relaying of the incoming call based on incoming call relaying status identifying information included in the call receiving request;
a display unit configured to receive the obtained forward source terminal apparatus from the incoming call relaying status identifying unit, to display information for a call-back in a form of including a display of the forward source terminal apparatus based on the received forward source terminal information; and
an operation unit configured to receive an operation of selecting on the display unit, on an occasion of a call-back from the forward destination terminal apparatus, in such a way that information representing the forward source terminal apparatus is to be applied to call-back originator information representing an originator of the call-back in accordance with the forward source terminal information representing the forward source terminal apparatus obtained by the incoming call relaying status identifying unit, instead of information representing the forward destination terminal apparatus.

\* \* \* \* \*